Patented Oct. 10, 1939

2,175,402

UNITED STATES PATENT OFFICE 2,175,402

CONTROL SYSTEM

Andrew A. Kucher, Dayton, Ohio, assignor, by mesne assignments, to General Motors Corporation, a corporation of Delaware Application September 29, 1932, Serial No. 635,392
Renewed December 7, 1937

11 Claims. (Cl. 172—279)

This invention relates to refrigeration.

I have invented a refrigerating system in which the system runs continuously without stopping for temperature adjustments and is inherently so designed, that it maintains the desired temperatures in the object being cooled notwithstanding the continuous operation. This type of system, when it is operated by an electric motor, starts and stops a relatively few times during its life when compared to that type of system which maintains the desired temperatures by stopping and starting cycles. It is among the objects of this invention to provide a control for the electric motor of such a system, which control is relatively simple and inexpensive.

In the continuously operating refrigerating system of the character above referred to, it sometimes happens that the main line current temporarily fails, due to an electrical storm or other disturbance and it is among the objects of this invention to provide a device which automatically restarts the system when such a temporary line failure has occurred.

Further objects and advantages of the present invention will be apparent from the following description, reference being had to the accompanying drawings, wherein a preferred form of the present invention is clearly shown.

In the drawings:

Fig. 7 is a diagrammatic showing of a refrigerating system similar to that shown in Fig. 1, but being provided with the automatic restarting device; and Fig. 8 is a vertical cross-sectional view of a control to be used in conjunction with the system shown in Fig. 7.

Figure 1:
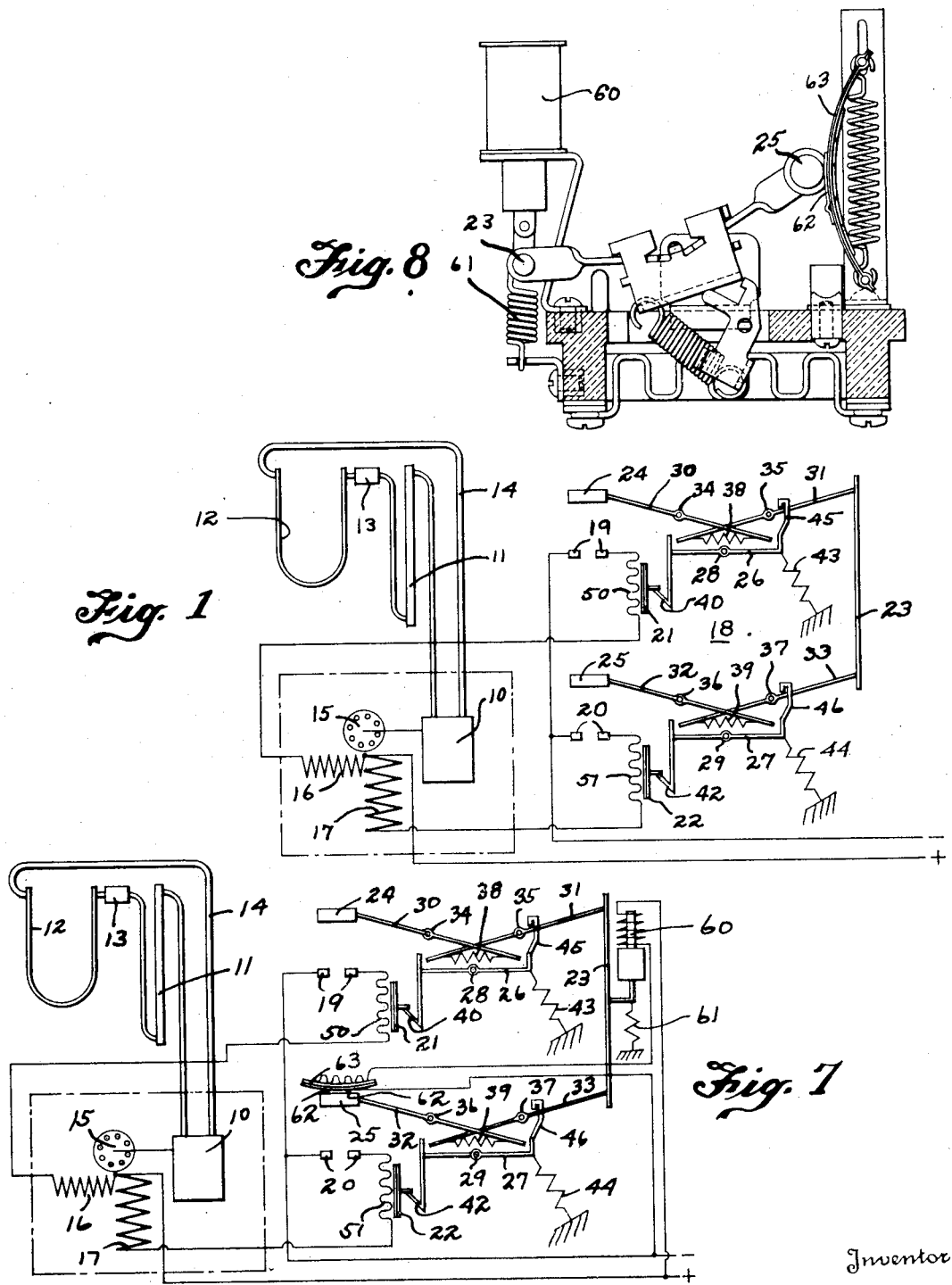
Fig. 1 is a diagrammatic showing of a refrigerating system embodying features of my invention.
Figure 2:
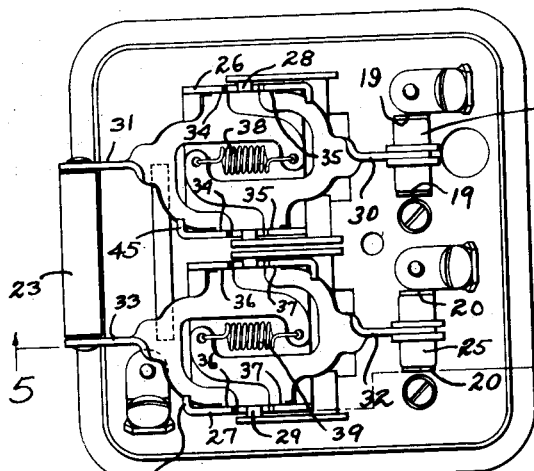
Fig. 2 is a plan view of a physical embodiment of a control for the system shown in Fig. 1 with the cover removed.
Figure 3:
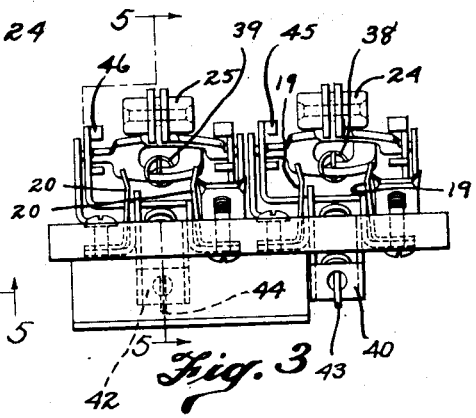
Fig. 3 is a vertical view of a mechanism shown in Fig. 2.
Figure 5:
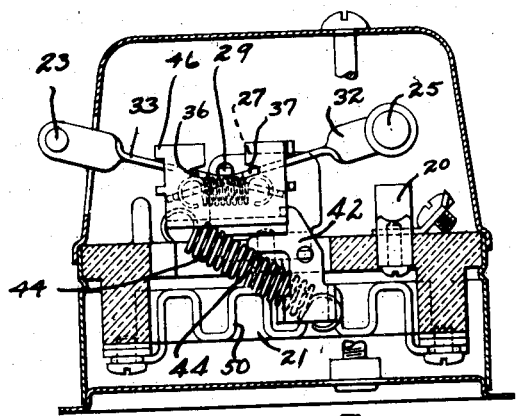
Fig. 5 is a vertical cross-sectional view taken along the line 5—5 of Fig. 2, this figure also showing the cover which has been omitted in Fig. 2.
Figure 6:
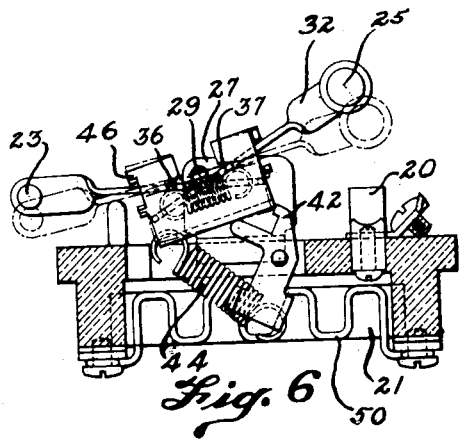
Fig. 6 is a vertical cross-sectional view of a portion of the mechanism shown in Fig. 5, but in a different position.
Figure 4:
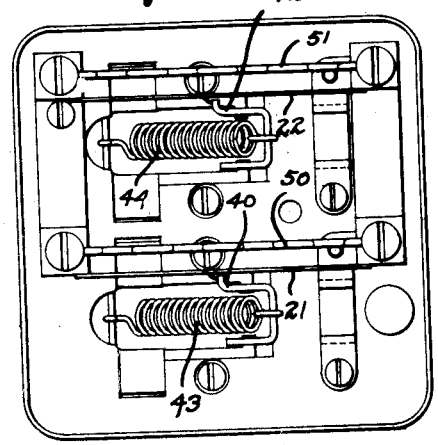
Fig. 4 is a bottom view of the device shown in Fig. 2.

A refrigerating system embodying features of this invention is designed to operate continuously without stopping for temperature adjustments and is of such a character and capacity, that it automatically maintains proper temperature conditions in the object to be cooled, notwithstanding such continuous operation. Such a system has been more fully described in my copending application, Serial No. 599,239, filed March 16, 1932, to which reference is hereby made for a further disclosure of such a system.

Briefly, such a system includes a compressor 10, a condenser 11, an evaporator 12. The compressor discharges the compressed refrigerant to the condenser 11 which in turn discharges liquefied refrigerant through the expansion device 13 to the evaporator 12 where the refrigerant is evaporated and returns through the line 14 to the compressor 10. The expansion device 13 may be of any suitable character, but preferably is of the elongated orifice type which maintains a fixed, and continuously open orifice, so calibrated as to length and cross-sectional area, that it maintains the evaporator 12 at the proper temperature to maintain the object being cooled at a substantially constant temperature notwithstanding variations in the surrounding atmosphere. In such a system, the elongated orifice in the expander 13 permits a continuous passage of refrigerant therethrough, and should the compressor 10 stop temporarily, this flow through the orifice continues and in a relatively short time equalizes the pressures throughout the refrigerating system, so that if the compressor should be re-started after such a short time, it starts with substantially no load.

Under ordinary conditions, such a system is stopped only for the purpose of defrosting the evaporator 12 and this defrosting operation is performed only once or twice a month and is not of the type of stopping operation which is intended to maintain temperature conditions in the object being cooled. On the contrary, such a stopping operation generally permits the object being cooled to warm above the desired temperature, but the operation is performed because of the large accumulation of frost on the evaporator and because of its undesirable inconvenience. After such a stopping operation and because of its long duration, the compressor starts under no load characteristics and hence the compressor need not be provided with unloading mechanism, other than the expander 13 itself. The motor 15 for driving the compressor may be of the split phase type which is provided with a starting winding 16 and a running winding 17, and, as is usual with this type of motor the starting torque is small. Such a motor compressor unit is capable of starting only if the entire refrigeration system has become substantially equalized as to pressure throughout, or if the unit is provided with an unloader for removing the pressure differential load during the starting period. In this particular system, no unloader need be used, as it is possible to permit the system to equalize during the infrequent stops which may be necessary.

A starting control for such a system need not be of a complicated character, and for this reason I have provided a relatively simple starting control, which is diagrammatically shown at 18. This control includes stationary starting winding contacts 19, and stationary running winding contacts 20, and these contacts are provided, respectively, with a movable starting winding contact 24 and a movable running winding contact 25 for properly closing and opening their respective circuits to energize the starting winding for a period which will permit the motor to attain a speed sufficient to insure operation of the motor on the running winding and thereafter deenergize the starting winding and also to energize the running winding 17 and to maintain it normally energized as long as desired by the user. If, however, the motor should be overloaded the running winding contacts are opened. To attain such controls, a starting thermostat 21 is provided which automatically opens the starting contacts 19, 24 after a period sufficiently long to permit the motor to attain its normal running speed and a running thermostat 22 is provided which maintains the running contacts 20, 25 normally closed; but which opens them if the motor becomes overloaded. These thermostats are provided with a common actuating or manually movable member 23, to open and close the contacts. The actuating member 23 is made subservient to the thermostats 21 and 22, so that the contacts 19, 24 or 20, 25 cannot be closed when the thermostats are above their respective critical control temperatures.

For the purpose of rendering the actuating member 23 subservient to the thermostats, the movable contacts 24 and 25 are mounted on resetting carriages 26 and 27 in such a manner that they cannot be caused to bridge the contacts 19 or 20 as long as thermostats 21 or 22 are above the critical temperature. To this end, the resetting carriages 26 and 27 are pivoted at the pivot points 28 and 29. The carriage 26 carries the arms 30 and 31 while the carriage 27 carries the arms 32 and 33. These arms are pivoted on the pivot points 34 to 37 inclusive, the points 34 and 35 being on carriage 26 and the points 36 and 37 being on the carriage 27. The arms 30 and 31 are joined by the snap producing spring 38 while the arms 32 and 33 are joined by the snap producing spring 39. The carriage 26 is provided with a hook 40 for engagement with the thermostat 21 while the carriage 27 is provided with a hook member 42 for engagement with the thermostat 22. The carriages are provided, respectively, with springs 43 and 44, so that when the hook members 40 and 42 respectively are released by their respective thermostats, the carriages are caused to swing about the pivots 28 and 29 by the contraction of the springs 43 and 44 and thus lift the bridging members 24 and 25 to deenergize the respective windings.

The actuating member 23 is loosely connected to the arms 31 and 33, so that the carriages 26 and 27 may be independently released by their respective thermostats without disturbing setting of the other carriage. This is accomplished in this particular embodiment by a loose connection between the arms 31 and 33 and the actuating member 23 such that the actuating members may pivot slightly about the arm.

As shown in Fig. 1, the control mechanism has been reset to engage the hooks 40 and 42 with the thermostats 21 and 22. In the particular embodiment shown, this is accomplished by providing hooks 45 and 46 on carriages 26 and 27 respectively, these hooks engaging the arms 31 and 33 respectively when the actuating member 23 is moved upwardly. Thus by the manipulation of the member 23 upwardly, the carriages 26 and 27 can be made to swing slightly counterclockwise as shown in Fig. 1 to cause the hooks 40 and 42 to engage the thermostats 21 and 22. After the control has been reset by this upward movement of the actuating member 23, the bridging members 24 and 25 are moved downwardly by a downward manipulation of the actuating member 23, thus causing the arms 30 to 33 inclusive to swing about their respective pivots and causing the contacts 24 and 25 to move to their lowermost position by a snap action.

After the downward movement of the bridging contact members 24 and 25 has occurred, both windings 16 and 17 are energized and the current flowing through these windings warms the thermostats 21 and 22 respectively either by flowing through the thermostats themselves, or by flowing through resistances 50 and 51 respectively which are adjacent to the thermostats. The resistances 50 and 51 preferably are made of substantially the same sensitivity to current flowing and since the starting winding 16 consumes more current than the running winding 17, the thermostat 21 releases the hook 40 before the thermostat 22 can release the hook 42. The sensitivity of the thermostats, however, is such that the thermostat 22 will not release the hook 42 except when the motor is overloaded. The current flow required for this has been found to be sufficient, when applied to the thermostat 21, to provide a sufficiently long starting period for the motor. Thus it is to be seen that by this control, a combined starting and overload control is provided which is relatively simple and effective in character.

This type of control may also be provided with an automatic resetting device capable of resetting the control after a temporary line failure, this resetting operation automatically taking place when the line is again reenergized. To this end, as shown in Fig. 7, the actuating member 23 may be provided with a solenoid 60 and with a spring 61. Solenoid actuating contacts 62 are provided, and these are adapted to be bridged by the running winding bridging contact 25. The contacts 62 are mounted on a snap acting bi-metal 63 which withdraws the contacts 62 from the contact 25 after a short interval of time, the interval being longer than the cooling period of the thermostat 22. Under normal operation, the system shown in Fig. 7 is started manually exactly as described with respect to Fig. 1. When the line current is temporarily stopped and re-started, the contact 24 is in its upper position, and the contact 25 is in its lower position, this being the position which it occupied when the current failed. When the current flows again, only the running winding is energized, under which conditions the motor naturally fails to start. After a short time the thermostat 22 becomes heated and the contact 25 rises and closes the contacts 62. This immediately energizes the solenoid 60 which pulls the actuating member 23 upwardly against the tension of the spring 61. The solenoid 60 continues to be energized as long as the contacts 62 are energized; but when the bi-metal 63 snaps them away from contact 25, the solenoid is de-energized and permits the spring 61 to pull the actuating member 23 down. In the meantime, the thermostats 21 and 22 have cooled, so that the hooks 40 and 42 are engaged before the actuating member 23 is pulled down, thus causing the contacts 19 and 20 to be closed. This initiates a starting cycle, current flowing through both the starting winding and the running winding. After a short period of time, sufficient to permit the motor to attain its full speed, the thermostat 21 becomes heated and releases the hook 40 thus opening the contacts 19 and de-energizes the winding 16. If the refrigerating system has become sufficiently equalized as to pressure to permit the motor to start, the running winding continues to be energized so long as the user desires. However, if the line failure is of a very short duration, the refrigerating system may not have been sufficiently equalized as to pressure to permit the motor to start, and if such is the case, the running winding thermostat 22 will become heated and release the hook 42 thus opening the contacts 20 and stopping the motor. As soon as this has occurred, however, the contact 25 closes the contacts 62 and the solenoid 60 is once again energized to pull the actuating member 23 upwardly where it remains a sufficient length of time to permit the thermostat 22 to cool. Thereafter, once again, when the bi-metal 63 snaps the contacts 63 away from contact 25, 61 pulls the actuating member 23 downwardly to reclose contacts 19 and 20 and thus once again re-initiating a starting cycle. These starting and overloading cycles continue to occur every two or three minutes, until the refrigerating system equalizes as to pressure (which usually requires about ten or fifteen minutes) after which the system continues to run indefinitely as long as required by the user.

While the form of embodiment of the invention as herein disclosed, constitutes a preferred form, it is to be understood that other forms might be adopted, all coming within the scope of the claims which follow.

What is claimed is as follows:

1. A starting control for an electric motor having a starting winding and a running winding, said control comprising starting contacts for controlling an electric circuit through said starting winding, a starting thermostat responsive to current flow through said starting winding for opening said contacts, running contacts for controlling an electric circuit through said running winding, a running thermostat responsive to current flow through said running winding for opening said running contacts, said thermostats being substantially equal in current flow sensitivity and having a critical value such that said starting thermostat opens said starting contacts only after the motor has attained a speed sufficient normally to insure operation on the running winding and said running thermostat opens said running contacts only when said motor is overloaded, and a common actuating member for opening or closing said contacts, said actuating member having automatic resetting means permitting said contacts to be closed only when their respective thermostats are cooled below their critical temperatures.

2. In an electric motor control system, the combination of a motor having a starting winding and a running winding, a first circuit controller for controlling the starting winding, a second circuit controller for controlling at least the running winding, thermal current means adapted to open the first circuit controller when the motor approaches running speed after starting, and current responsive means for opening the second circuit controller upon the flow of excessive current and for automatically closing the second circuit controller after an interruption of the flow of current to the running winding.

3. In an electric motor control system, the combination of a motor having a starting winding and a running winding, a first circuit controller for controlling the starting winding, a second circuit controller for controlling at least the running winding, thermal current means adapted to open the first circuit controller when the motor approaches running speed after starting, and thermal current responsive means for opening the second circuit controller upon the flow of excessive current and for automatically closing the second circuit controller after an interruption of the flow of current to the running winding.

4. In an electric motor control system, the combination of a motor having a starting winding and a running winding, a first circuit controller for controlling the starting winding, a second circuit controller for controlling at least the running winding, thermal current means adapted to open the first circuit controller when the motor approaches running speed after starting, and current responsive means for opening the second circuit controller upon the flow of excessive current and for automatically closing the second circuit controller after an interruption of the flow of current to the running winding, said last named means including time delay means for preventing maintenance of the second circuit controller in closed position until a predetermined time has elapsed after the occurrence of an excessive current flow in the motor.

5. In an electric motor control system, the combination of a motor having a starting winding and a running winding, a first circuit controller for controlling the starting winding, a second circuit controller for controlling at least the running winding, thermal current means adapted to open the first circuit controller when the motor approaches running speed after starting, and thermal current responsive means for opening the second circuit controller upon the flow of excessive current and for automatically closing the second circuit controller after an interruption of the flow of current to the running winding, said last named means including time delay means for preventing maintenance of the second circuit controller in closed position until a predetermined time has elapsed after the occurrence of an excessive current flow in the motor.

6. In an electric motor control system, the combination of a motor having a starting winding and a running winding, a first circuit controller for controlling the starting winding, a second circuit controller for controlling at least the running winding, current means arranged in parallel electric circuit relation to the running winding and responsive to the current flow through the starting winding for opening the first circuit controller, and current means arranged in parallel electric circuit relation to the starting winding and said first mentioned current means and responsive to the current flowing through said running winding for opening the second circuit controller upon excessive flow of current, and electromagnetic means for resetting one of said controllers.

7. In an electric motor control system, the combination of a motor having a starting winding and a running winding, circuit controlling means in series with the starting winding and in parallel with the running winding for controlling the deenergization of the starting winding independently of the running winding, electromagnetically operated means for closing said circuit controlling means, and thermal means for opening the circuit controlling means to deenergize the starting winding.

8. In an electric motor control system, the combination of a motor having a starting winding and a running winding, circuit controlling means in series with the starting winding and in parallel with the running winding for controlling the deenergization of the starting winding independently of the running winding, electromagnetically operated means responsive to the energization of the motor for closing said circuit controlling means, and electro-thermal means responsive to the cumulative heating effect of the current flowing through one of said windings for opening said circuit controlling means to deenergize the starting winding.

9. In an electric motor control system, the combination of a motor having a starting winding and a running winding, a first circuit controller for controlling the flow of electric energy through the starting winding, a second circuit controller for controlling the flow of electric energy through the running winding, said first and said second controllers being arranged in parallel electric circuit relationship, overload means for opening said second circuit controller, means for opening the first circuit controller, and means for simultaneously closing both said first and said second circuit controller.

10. In an electric motor control system, the combination of a motor having a starting winding and a running winding, a first circuit controller for controlling the flow of electric energy through the starting winding, a second circuit controller for controlling the flow of electric energy through the running winding, overload means for opening said second circuit controller, means for opening the first circuit controller, and electromagnetic means for closing both first and second circuit controllers.

11. In an electric motor control system, the combination of a motor having a starting winding and a running winding, a first circuit controller for controlling the flow of electric energy through the starting winding, a second circuit controller for controlling the flow of electric energy through the running winding, overload means for opening said second circuit controller, means for opening the first circuit controller, and current operated means for closing the first and second circuit controllers.

ANDREW A. KUCHER.